(12) United States Patent
Matsumoto

(10) Patent No.: US 9,459,406 B2
(45) Date of Patent: Oct. 4, 2016

(54) POLARIZATION BEAM SPLITTER AND OPTICAL DEVICE

(71) Applicant: NEC Corporation, Tokyo (JP)

(72) Inventor: Takashi Matsumoto, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 14/768,239

(22) PCT Filed: Nov. 19, 2013

(86) PCT No.: PCT/JP2013/006763
§ 371 (c)(1),
(2) Date: Aug. 17, 2015

(87) PCT Pub. No.: WO2014/125535
PCT Pub. Date: Aug. 21, 2014

(65) Prior Publication Data
US 2015/0378098 A1    Dec. 31, 2015

(30) Foreign Application Priority Data

Feb. 18, 2013    (JP) .............................. 2013-028866

(51) Int. Cl.
*G02B 6/00*    (2006.01)
*G02F 1/035*    (2006.01)
(Continued)

(52) U.S. Cl.
CPC ............... *G02B 6/126* (2013.01); *G01J 9/02* (2013.01); *G02B 6/1228* (2013.01);
(Continued)

(58) Field of Classification Search
CPC ............ G02B 6/126; G02B 2006/121; G02B 2006/12097; G02B 6/29352
See application file for complete search history.

(56) References Cited

U.S. PATENT DOCUMENTS 6,587,609 B2 *   7/2003   Lee .................... G02B 6/12011
                                                      385/129
8,131,120 B2 *   3/2012   Doerr .................... G02B 6/105
                                                       385/11

FOREIGN PATENT DOCUMENTS

JP    2007-256510    10/2007
JP    2012-154980    8/2012

OTHER PUBLICATIONS

Y. Hashizume et al., "Integrated polarization beam splitter using waveguide birefringence dependence on waveguide core width", Electronics Letters, vol. 37, No. 25, pp. 1517-1518, Dec. 2001.
D. Dai et al., "Compact Polarization Beam Splitter Using an Asymmetrical Mach-Zehnder Interferometer Based on Silicon-on-Insulator Waveguides", IEEE Photonics Technology Letters, vol. 24, No. 8, pp. 673-675, Apr. 2012.
(Continued)

*Primary Examiner* — Omar R Rojas
(74) *Attorney, Agent, or Firm* — Finnegan, Henderson, Farabow, Garrett & Dunner LLP

(57) ABSTRACT

Provided are a polarization beam splitter and an optical device with high productivity. A polarization beam splitter (PBS) according to an exemplary embodiment of the present invention includes: a demultiplexer (11) that is formed of a rib waveguide (50) and demultiplexes input light into first input light and second input light; a multiplexer (14) that is formed of the rib waveguide (50) and multiplexes the first input light and the second input light that are obtained by demultiplexing the input light by the demultiplexer (11); a first arm waveguide (12) that is formed of a channel waveguide (51) and guides the first input light to the multiplexer (11); and a second arm waveguide (13) that is formed of the channel waveguide (51), generates a phase difference in the first input light propagating through the first arm waveguide, and guides the second input light to the multiplexer (14).

5 Claims, 7 Drawing Sheets

(51) Int. Cl.
  *G02B 6/126* (2006.01)
  *G02B 6/293* (2006.01)
  *G01J 9/02* (2006.01)
  *G02B 6/122* (2006.01)
  *G02B 6/12* (2006.01)

(52) U.S. Cl.
  CPC ....... *G02B 6/2938* (2013.01); *G02B 6/29352* (2013.01); *G01J 2009/0288* (2013.01); *G02B 6/122* (2013.01); *G02B 2006/121* (2013.01); *G02B 2006/12097* (2013.01)

(56) References Cited

OTHER PUBLICATIONS

M. Okuno et al., "Birefringence Control of Silica Waveguides on Si and Its Application to a Polarization-Beam Splitter/Switch", Journal of Lightwave Technology, vol. 12, No. 4, pp. 625-633, Apr. 1994.
International Search Report mailed Dec. 17, 2013 in corresponding PCT International Application.

* cited by examiner

POLARIZATION BEAM SPLITTER AND OPTICAL DEVICE

CROSS-REFERENCE TO RELATED PATENT APPLICATIONS

This application is a National Stage Entry of International Application No. PCT/JP2013/006763, filed Nov. 19, 2013, which claims priority from Japanese Patent Application No. 2013-028866, filed Feb. 18, 2013. The entire contents of the above-referenced applications are expressly incorporated herein by reference.

TECHNICAL FIELD

The present invention relates to a polarization beam splitter and an optical device.

BACKGROUND ART

In recent years, in regard to ultrahigh-speed communications exceeding 100 Gb/second, studies have been vigorously conducted on digital coherent communication by Dual Polarization Differential Quadrature Phase Shift Keying (DP-QPSK) excelling in wavelength use efficiency, receiving characteristics, and dispersion compensation capability. A receiver for DP-QPSK system requires a function to split an optical signal into polarized waves, and a 90-degree optical hybrid function for retrieving phase information from the split optical signals. The standardization of receivers having such functions has been studied by OIF (Optical Internetworking Forum), an industry group promoting high-speed data communications, and the development of receivers that comply with the specifications for the standardization has been vigorously pursued.

Incidentally, it is said that a planar lightwave circuit using optical waveguide technology is influential as a function to achieve the receiver of such DP-QPSK system. A silica waveguide is used for the planar lightwave circuit. However, it is difficult for the silica waveguide to increase a relative index difference between a core and a clad. The relative index difference of the silica waveguide is generally about 2%. Accordingly, the minimum bend radius of the waveguide is of the order of mm, and thus it is difficult to miniaturize a chip. Under such circumstances, recent interest has been focused not only on a coherent mixer, but also on a silicon waveguide (Patent Literature 1). Since silicon has a high refractive index of about 3.5, an excess loss is not generated even if the silicon waveguide is bent with a radius in the order of several μm to several hundreds of μm.

CITATION LIST

Patent Literature

[Patent Literature 1] Japanese Unexamined Patent Application Publication No. 2012-154980

SUMMARY OF INVENTION

Technical Problem

Silicon waveguides generally include a channel waveguide and a rib waveguide. The channel waveguide is covered with a clad. The thickness of the channel waveguide is about 200 nm. The channel waveguide can be formed with an extremely small bend radius of about several μm, while the roughness of waveguide side walls is easily felt and the waveguide has a large propagation loss of 2 to 3 dB/cm. Further, the channel waveguide requires a higher precision and use of an EB (Electron Beam) writer, which takes a long time to draw patterns. On the other hand, the rib waveguide is formed in such a manner that the waveguide is sandwiched between clad layers. The thickness of the rib waveguide is about 1 to 3 μm. The bend radius of the waveguide is about 200 μm, which is not as small as that of the channel waveguide, while the propagation loss of the rib waveguide is 0.5 to 1.0 dB/cm, which is smaller than that of the channel waveguide. In the preparation of the rib waveguide, sufficient characteristics can be obtained by stepper exposure, and thus the productivity of the rib waveguide is higher than that of the channel waveguide.

For the above reasons, the rib waveguide is employed in many cases in light of insertion loss and mass productivity (cost). The commoditization of coherent receivers is inevitable, and there is a demand for low-cost production thereof. Therefore, research and development of a coherent mixer as a component to be achieved by the rib waveguide has been conducted.

Also in the case of achieving the coherent mixer using a rib silicon waveguide, a polarization beam splitting function can be achieved by a Mach-Zehnder interferometer, like the silica waveguide. The refractive index dispersion in a structure of the silicon waveguide is larger than that of a typical silica waveguide, which is advantageous in term of size. However, the silicon waveguide is sensitive to parameters such as a waveguide width, a rib height, and a thickness of a core Si layer. Therefore, the silicon waveguide has a productivity problem. The present invention has been made in view of the above problem.

It is an object of the present invention to provide a polarization beam splitter and an optical device with high productivity.

Solution to Problem

An exemplary aspect of the present invention is a polarization beam splitter including: a demultiplexer that is formed of a rib waveguide and demultiplexes input light into first input light and second input light; a multiplexer that is formed of a rib waveguide and multiplexes the first input light and the second input light, the first input light and the second input light being obtained by demultiplexing the input light by the demultiplexer; a first arm waveguide that guides the first input light to the multiplexer, at least a part of the first arm waveguide being formed of a channel waveguide; and a second arm waveguide that generates a phase difference in the second input light with respect to the first input light propagating through the first arm waveguide, and guides the second input light to the multiplexer, at least a part of the second arm waveguide being formed of a channel waveguide.

Advantageous Effects of Invention

According to the present invention, it is possible to provide a polarization splitter and an optical device with high productivity.

DESCRIPTION OF EMBODIMENTS

Figure 1:
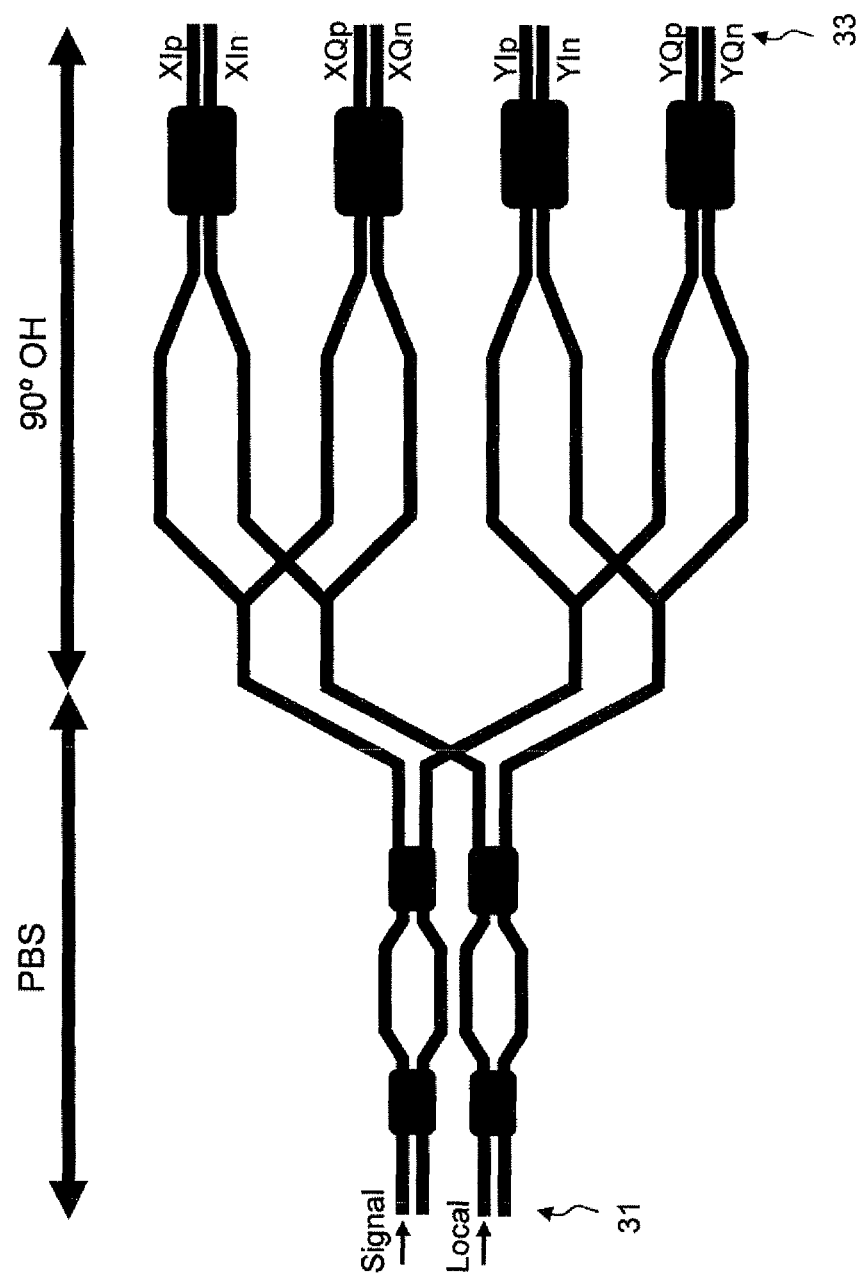
FIG. 1 is a schematic view showing an overall configuration of an optical device.

Exemplary embodiments of the present invention will be described with reference to the accompanying drawings. The following exemplary embodiments are examples of the present invention, and the present invention is not limited to the following exemplary embodiments. The same reference numerals in the specification and the drawings denote the same components.

FIG. 1 is a schematic view showing a coherent mixer element 1 used for digital coherent communication. The coherent mixer element 1 is, for example, a planar lightwave circuit (PLC), and includes a polarization beam splitter PBS and a 90-degree optical hybrid 90° OH. The polarization beam splitter PBS is a circuit having a polarization beam splitting function. The polarization beam splitter PBS is, for example, a Mach-Zehnder interferometer that uses the birefringence of arm waveguides. The 90-degree optical hybrid 90° OH is a circuit (coherent mixer circuit) having a function for retrieving phase information.

The coherent mixer element 1 is provided in, for example, a receiver in a dual polarization differential quadrature phase shift keying system. Specifically, the coherent mixer element 1 is a light reception FE (front-end) that is provided in the receiver. The coherent mixer element 1 is an integrated optical device in which the polarization beam splitting function and the phase information retrieving function are accommodated in one package.

Input ports 31 are provided on the input side of the polarization beam splitter PBS. The input ports 31 receive signal light Signal and local oscillation light Local. The polarization beam splitter PBS demultiplexes the signal light Signal and the local oscillation light Local into orthogonal polarization components (X/Y components), and outputs the demultiplexed components to the 90-degree optical hybrid 90° OH.

The 90-degree optical hybrid 90° OH separates the orthogonal polarization components (X/Y components) and the orthogonal phase components (I/Q channels) of the input light into each orthogonal polarization component and each orthogonal phase component. For example, the 90-degree optical hybrid 90° OH includes eight output ports 33. The eight output ports 33 respectively correspond to XIp, XIn, XQp, XQn, YIp, YIn, YQp, and YQn. The 90-degree optical hybrid 90° OH outputs signals from the respective output ports to an OE (Optical/Electrical) conversion unit (not shown) and the like.

Figure 2:
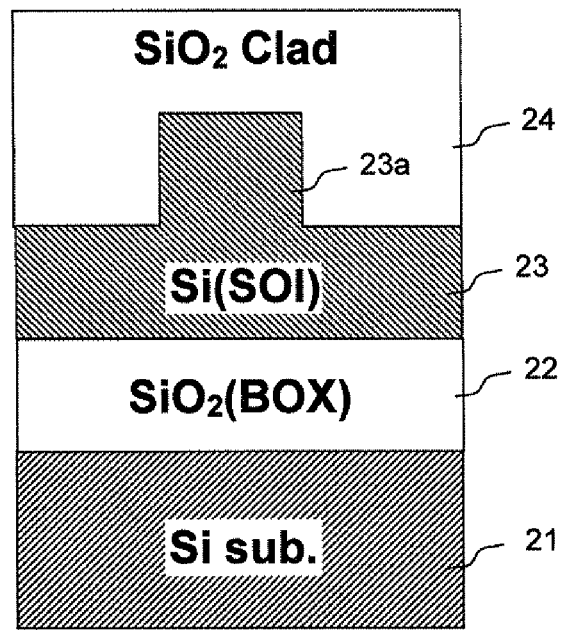
FIG. 2 is a diagram showing a cross-section of a rib waveguide.
Figure 3:
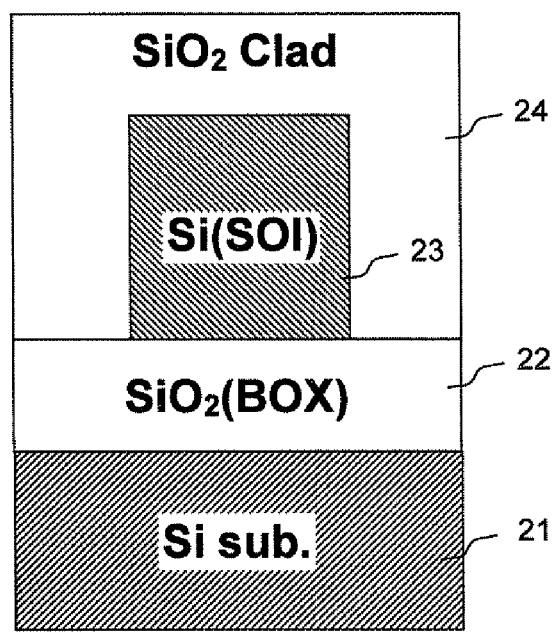
FIG. 3 is a diagram showing a cross-section of a channel waveguide.

The coherent mixer element 1 is formed of silicon waveguides. In each silicon waveguide, a relative index difference between a core and a clad can be increased. Accordingly, the minimum bend radius of a silicon waveguide can be reduced compared to that of a silica waveguide. The silicon waveguide has two types of structures, i.e., a rib structure and a channel structure. FIG. 2 shows a cross-sectional view of a silicon waveguide having a typical rib structure, and FIG. 3 shows a cross-sectional view of a silicon waveguide having a typical channel structure.

Each of a rib waveguide 50 and a channel waveguide 51 includes a substrate 21, a lower clad layer 22, a core layer 23, and an upper clad layer 24. The lower clad layer 22 is formed on the substrate 21 which is a silicon substrate. In this case, the lower clad layer 22 is an $SiO_2$ film and is formed of, for example, a buried oxide film (BOX). The core layer 23 is formed on the lower clad layer 22. The core layer 23 is an Si film such as an SOI (Silicon On Insulator) substrate. The upper clad layer 24 is formed on the core layer 23. The upper clad layer 24 is, for example, an $SiO_2$ film. The core layer 23 is formed of a material having a refractive index different from that of the lower clad layer 22 and the upper clad layer 24.

In a cross-section of the rib structure, the core layer 23 includes a rib 23a that projects upward. Both sides of the rib 23a are covered with the upper clad layer 24. The thickness of the rib structure varies in a range from about 1 to 3 μm. The bend radius of the rib structure is about 200 μm, which is not as small as that of the channel structure, and the propagation loss of the rib structure is 0.5 to 1.0 dB/cm, which is smaller than that of the channel structure. In the preparation of the rib waveguide, sufficient characteristics can be obtained by stepper exposure, and thus the productivity of the rib waveguide is higher than that of the channel waveguide.

In the channel structure, the cross-section of the core layer 23 serving as a waveguide has a substantially rectangular shape. The upper clad layer 24 covers the core layer 23. The lower clad layer 22 and the upper clad layer 24 cover the entire core layer 23. The polarization beam splitter PBS according to this exemplary embodiment has both the channel structure and the rib structure.

Figure 4:
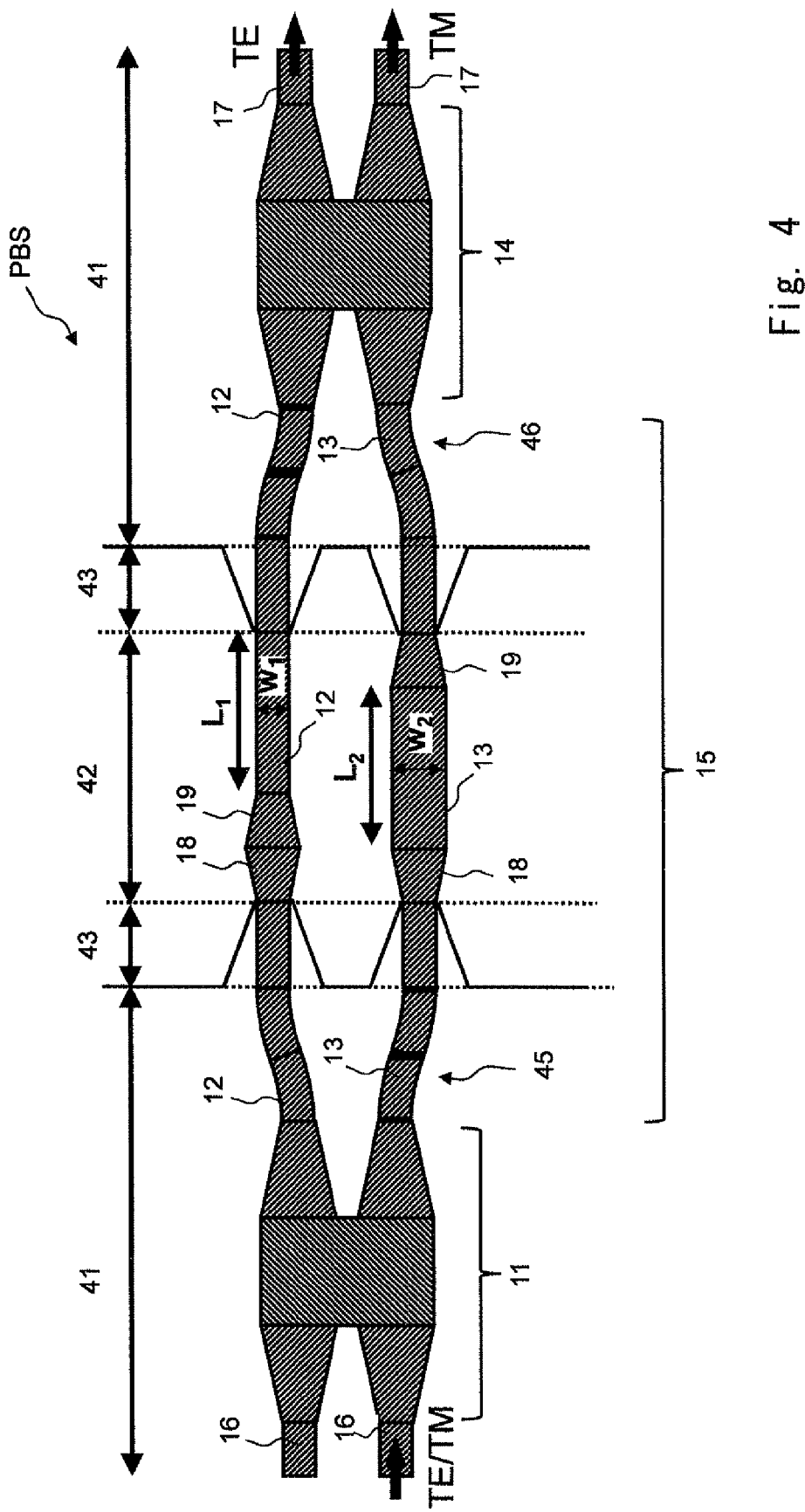
FIG. 4 is a plan view showing a schematic configuration of a Mach-Zehnder PBS.

FIG. 4 shows a schematic view of the polarization beam splitter PBS. The polarization beam splitter PBS is a Mach-Zehnder polarization beam splitter which is monolithically integrated in the coherent mixer element 1. The polarization beam splitter PBS includes a demultiplexer 11, a multiplexer 14, an arm portion 15, input waveguides 16, and output waveguides 17. The arm portion 15 includes a first arm waveguide 12 and a second arm waveguide 13. The arm portion 15 is disposed between the demultiplexer 11 and the multiplexer 14. The arm portion 15 constitutes a Mach-Zehnder interferometer. The demultiplexer 11 and the multiplexer 14 are, for example, MMI (Multi-Mode Interference) couplers. In this case, each MMI coupler is a 2-input/2-output coupler. Alternatively, a directional coupler, a Y-branching device, and the like can be used as the demultiplexer 11 and the multiplexer 14.

The demultiplexer 11 is coupled to the two input waveguides 16 and demultiplexes input light into first input light and second input light. For example, the demultiplexer 11 divides signal light at a ratio of 50:50, thereby generating the first input light and the second input light. The demultiplexer 11 is coupled to the first arm waveguide 12 and the second arm waveguide 13. The first input light, which is obtained by demultiplexing the input light by the demultiplexer 11, propagates through the first arm waveguide 12. The second input light, which is obtained by demultiplexing the input light by the demultiplexer 11, propagates through the second arm waveguide 13. The first arm waveguide 12 and the second arm waveguide 13 are each coupled to the multiplexer 14.

The multiplexer 14 multiplexes the first input light propagating through the first arm waveguide 12 and the second input light propagating through the second arm waveguide 13. The multiplexer 14 is coupled to the two output waveguides 17. The multiplexer 14 outputs TE (Transverse Electric) polarized light from one of the output waveguides 17, and outputs TM (Transverse Magnetic) polarized light from the other output waveguide 17. Thus, the polarization beam splitter PBS splits the input light into polarized waves.

The demultiplexer 11 and the multiplexer 14 are each formed of a rib-type silicon waveguide. At least a part of the arm portion 15 is formed of a channel silicon waveguide. Specifically, a channel waveguide is disposed between the rib waveguides. In the case of the channel waveguide, there is no need to take into consideration a variable factor, that is, a rib height, in the structure thereof. Further, a result of a calculation shows that the channel waveguide has a small sensitivity to the thickness of a core Si layer. Thus, the polarization beam splitter PBS in which at least a part of the arm portion is formed of a channel waveguide can achieve a higher productivity than that in which rib waveguides are employed as both of the arm waveguides.

The polarization beam splitter PBS includes a channel waveguide and a rib waveguide. A region in which the channel waveguide and the rib waveguide are provided will be described in detail below. As shown in FIG. 4, the polarization beam splitter PBS includes a rib-type region 41, a channel-type region 42, and a transition region 43. In the rib-type region 41, the rib waveguide 50 is provided as shown in FIG. 2. In the channel-type region 42, the channel waveguide 51 is provided as shown in FIG. 3. The transition region 43 is a region between the rib waveguide 50 and the channel waveguide 51.

The demultiplexer 11 and the multiplexer 14 are provided in the rib-type region 41. The rib-type region 41 extends to a part of the arm portion 15. For example, a fan-out 45 in which the interval between the first arm waveguide 12 and the second arm waveguide 13 gradually increases and a fan-in 46 in which the interval between the first arm waveguide 12 and the second arm waveguide 13 gradually decreases constitute the rib-type region 41. A part of the arm portion 15 is formed in the channel-type region 42. A region of the arm portion 15 that is formed between the channel-type region 42 and the rib-type region 41 corresponds to the transition region 43.

In this manner, at least a part of the first arm waveguide 12 is formed of the channel waveguide 51. The first arm waveguide 12 guides the first input light to the multiplexer 14. At least a part of the second arm waveguide 13 is formed of the channel waveguide 51. The second arm waveguide 13 generates a phase difference in the second input light with respect to the first input light propagation through the first arm waveguide 12, and guides the second input light to the multiplexer 14.

Figure 5:
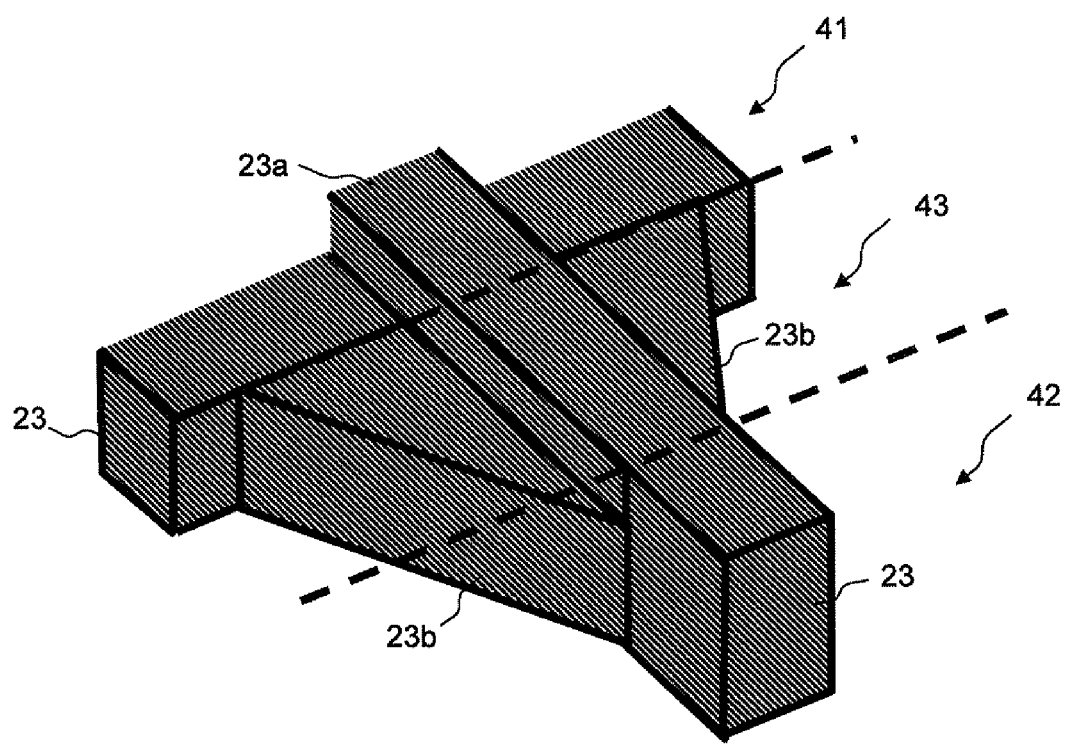
FIG. 5 is a perspective view showing a configuration of a transition region.

Referring to FIG. 5, the waveguide shape in the transition region 43 will be described. FIG. 5 is a perspective view showing the waveguide shape in the vicinity of the transition region 43. The core layer 23 including the rib 23a is formed in the rib-type region 41. The rib 23a projects upward from the core layer 23. The core layer 23 in the channel-type region 42 has the same height as that of the rib 23a in the rib-type region 41. In other words, the thickness of the core layer 23 including the rib 23a in the rib-type region 41 is substantially equal to the thickness of the core layer 23 in the channel-type region 42. The width of the core layer 23 in the channel-type region 42 is substantially equal to the width of the rib 23a in the rib-type region 41.

Tapered portions 23b at which the waveguide width gradually changes are formed in the transition region 43. At the tapered portions 23b, the waveguide width gradually decreases toward the channel-type region 42 from the rib-type region 41. The tapered portions 23b are formed on both side surfaces of the core layer 23 in the channel-type region 42. A boundary surface between the core and the clad layer has a tapered shape. The height of each of the tapered portions 23b is substantially equal to the height of the core layer 23 excluding the rib 23a in the rib-type region 41. That is, the thickness of each of the tapered portions 23b in the transition region 43 is substantially equal to the thickness of the core layer 23 excluding the rib 23a in the rib-type region 41. In other words, the height of each of the tapered portions 23b is lower than that of the core layer 23 in the channel-type region 42. At the tapered portions 23b, the light confinement in the rib waveguide 50 is different from that in the channel waveguide 51. Accordingly, unless the rib waveguide 50 and the channel waveguide 51 are seamlessly connected, a loss occurs. Therefore, the transition region 43 has a structure in which a slab region is narrowed as smoothly as possible, and thereby the structure turns into the channel type.

The width and height of the core layer 23 in the channel-type region 42 are, for example, 1 to 3 μm. Specifically, for example, the width of the core layer 23 is 1.35 μm and the height thereof is 1.5 μm.

Figure 6:
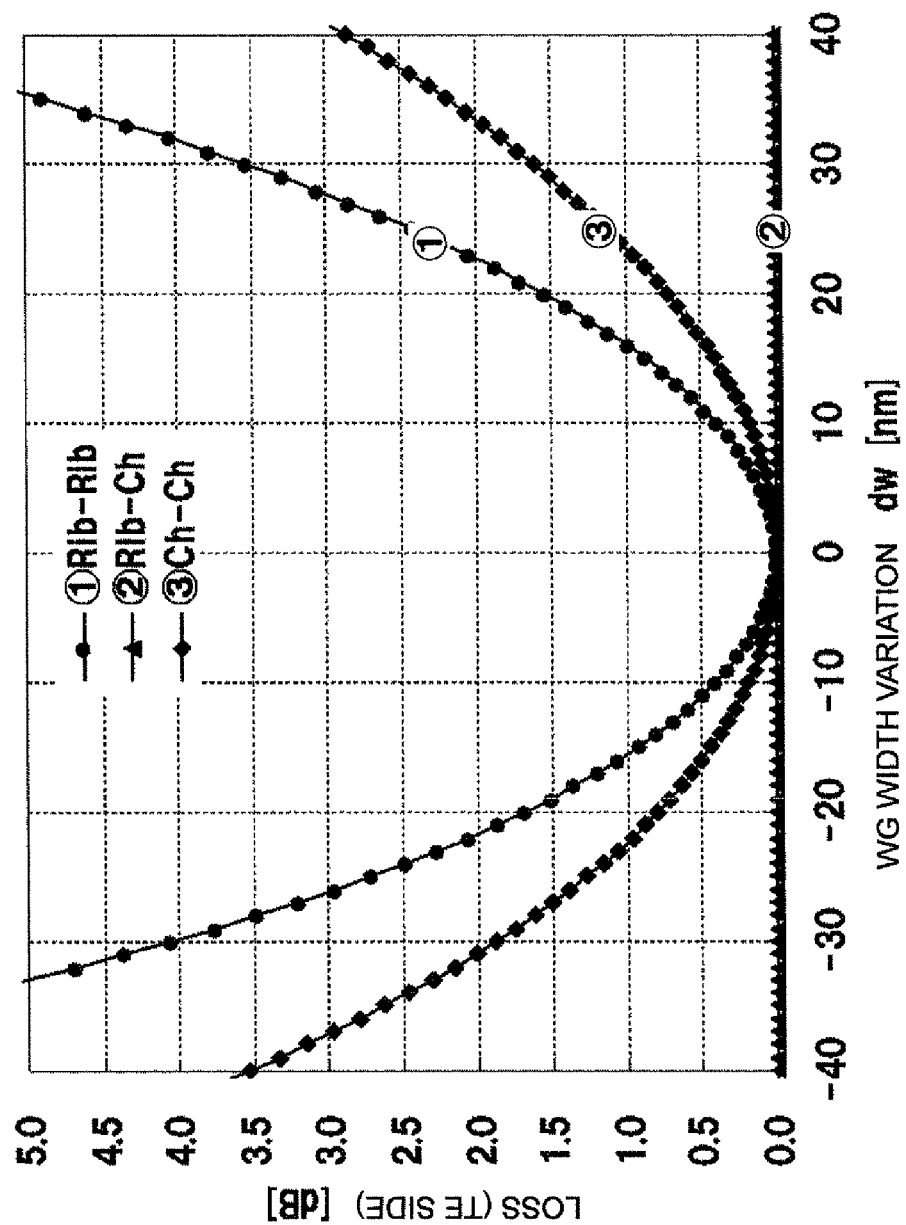
FIG. 6 is a graph showing a WG width tolerance.
Figure 7:
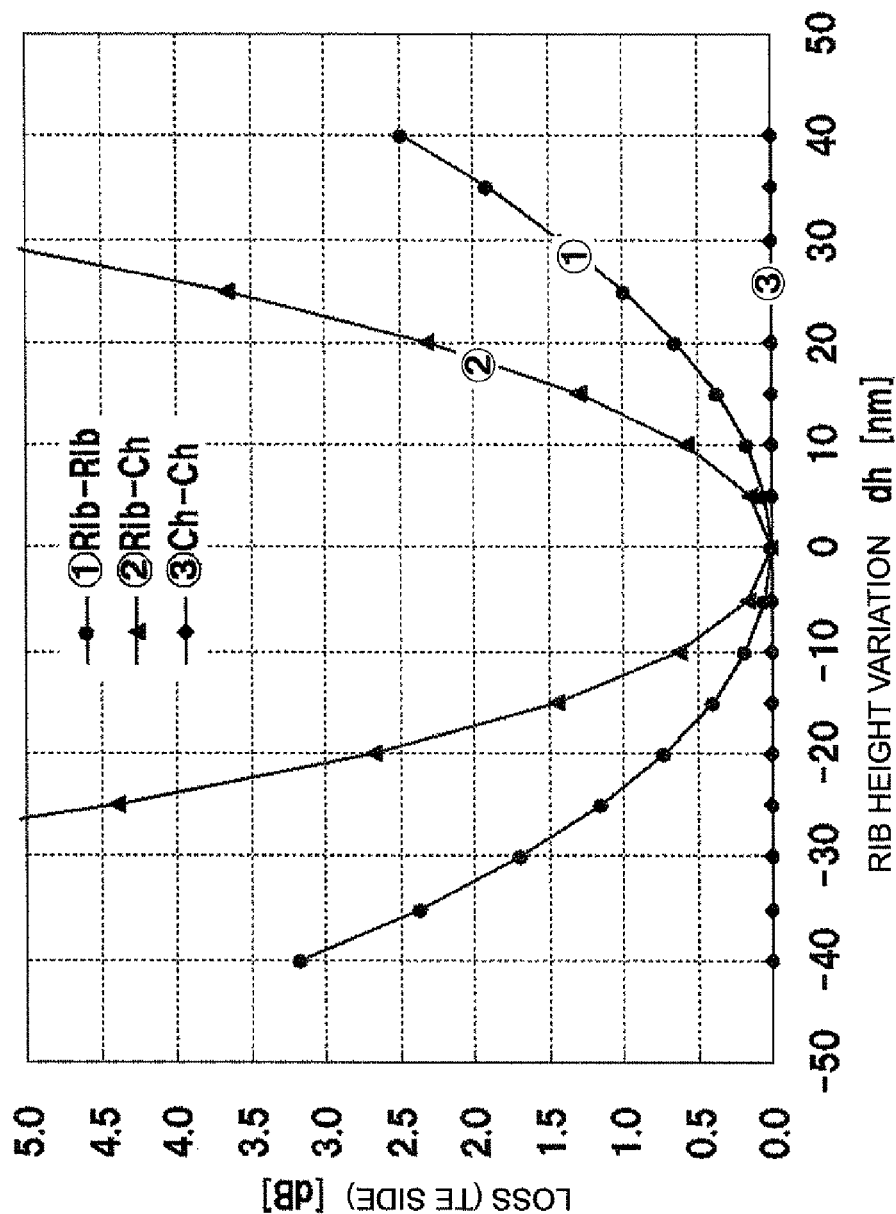
FIG. 7 is a graph showing a rib height tolerance.

Next, a loss due to manufacturing errors will be described. FIG. 6 shows a change in loss with respect to a variation in the waveguide width. FIG. 6 is a graph showing a loss in the TE polarized light when the waveguide width is varied. Assume that the same variation in the waveguide width occurs at both of the arms. FIG. 7 shows a change in loss with respect to a variation in the rib height. FIG. 7 is a graph showing a loss in the TE polarized light when the rib height is varied. Referring to FIGS. 6 and 7, a curve 1 represents a case where both the first arm waveguide 12 and the second arm waveguide 13 have the rib-type structure; a curve 3 represents a case where both the first arm waveguide 12 and the second arm waveguide 13 have the channel-type structure; and a curve 2 represents a case where one of the first arm waveguide 12 and the second arm waveguide 13 has the rib-type structure and the other one of the first arm waveguide 12 and the second arm waveguide 13 has the channel-type structure.

As shown in FIG. 7, in the case where both the first arm waveguide 12 and the second arm waveguide 13 have the channel-type structure, the rib height is not a variable factor. When the first arm waveguide 12 and the second arm waveguide 13 have the channel-type structure, a loss due to a variation in the rib height can be reduced. In the case where both the first arm waveguide 12 and the second arm waveguide 13 have the rib-type structure, a loss due to a variation in the waveguide width is larger than that in the case where the both waveguides have the channel-type structure, as shown in FIG. 6. Thus, in this exemplary embodiment, the first arm waveguide 12 and the second arm waveguide 13 are each formed of the channel waveguide 51. Consequently, a loss due to a variation in the waveguide width can be reduced.

The principle of the Mach-Zehnder type polarization beam splitter will be described. In the Mach-Zehnder interferometer, the coupler output balance of the multiplexer 14 changes according to the phase difference generated between the first arm waveguide 12 and the second arm waveguide 13. In the case of polarization separation, the arm portion 15 is designed in such a manner that, for example, the phase difference for the TE polarized light becomes zero and the phase difference for the TM polarized light becomes π. Accordingly, the multiplexer 14 outputs the TE polarized light from one of the output waveguides 17 and outputs the TM polarized light from the other output waveguide 17.

As shown in FIG. 4, assume that the width of the first arm waveguide 12 is represented by $w_1$; the length of the first arm waveguide 12 is represented by $L_1$; the width of the second arm waveguide 13 is represented by $w_2$; and the length of the second arm waveguide 13 is represented by $L_2$. The widths $w_1$ and $w_2$ and the lengths $L_1$ and $L_2$ of the arm waveguides are set so as to satisfy both Expression (1) and Expression (2) at the same time.

$$n_{TE}(w_1) \cdot L_1 - n_{TE}(w_2) \cdot L_2 = 0 \quad (1)$$

$$n_{TM}(w_1) \cdot L_1 - n_{TM}(w_2) \cdot L_2 = \lambda/2 \quad (2)$$

Figure 8:
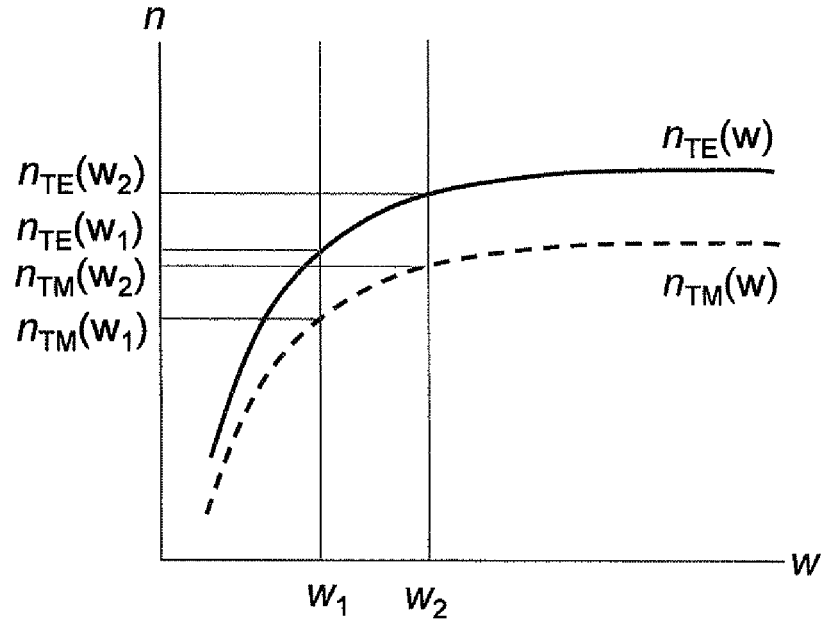
FIG. 8 is a graph showing a change in equivalent refractive index with respect to a waveguide width.
Figure 9:
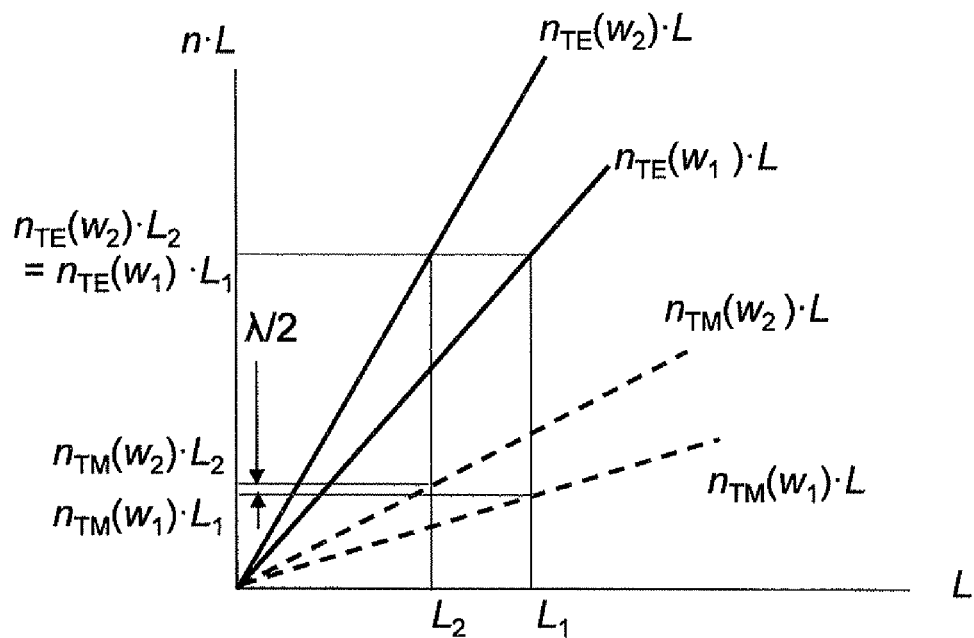
FIG. 9 is a graph showing a change in optical path length with respect to an arm length.

Note that $n_{TE}$ represents an equivalent refractive index for the TE polarized light, and $n_{TM}$ represents an equivalent refractive index for the TM polarized light. λ represents a wavelength of input light. For example, FIG. 8 shows a change in equivalent refractive index n with respect to the waveguide width w. As the waveguide width w increases, the equivalent refractive index n increases. In this case, the optical path length n×L as shown in FIG. 9 is obtained when $w_1$ and $w_2$ are selected as the widths of both of the arms, and the waveguide length $L_1$ and the waveguide length $L_2$ which satisfy both Expression (1) and Expression (2) are determined. The waveguide widths $w_1$ and $w_2$ and the waveguide lengths $L_1$ and $L_2$ are determined under phase conditions in which TE polarized light beams have the same phase and TM polarized light beams have opposite phases.

In this manner, the waveguide width and length of each of the first arm waveguide 12 and the second arm waveguide 13 are determined. Accordingly, in the channel-type region 42, a birefringence control for the first input light and the second input light can be made so as to satisfy phase conditions. Specifically, phase conditions are satisfied in which the phase difference between the TE polarized light propagating through the first arm waveguide 12 and the TE polarized light propagating through the second arm waveguide 13 becomes 0 and the phase difference between the TM polarized light propagating through the first arm waveguide 12 and the TM polarized light propagating through the second arm waveguide 13 becomes π. The TE polarized light is output from one of the output waveguides 17, and the TM polarized light is output from the other output waveguide 17.

The formation of the arm portion 15 using the channel waveguide 51 as described above makes it possible to increase the tolerance for manufacturing errors and the like. This leads to an improvement in the yield and productivity of the polarization beam splitter. Further, a loss due to a phase error caused by a variation in the waveguide width can be reduced. In an optical circuit formed of rib waveguides, an excess loss is generally lower than that in a configuration formed only of channel waveguides. Therefore, in the polarization beam splitter PBS including the rib waveguide and the channel waveguide in combination, an excess loss lower than that in a polarization beam splitter formed only of channel waveguides can be expected. Furthermore, a desired waveguide length and a desired waveguide width can be obtained in a simplified manner. This eliminates the need for the configuration for adjusting the phase difference after the manufacturing process, leading to an improvement in the productivity of the polarization beam splitter.

The rib waveguide 50 and the channel waveguide 51 can be formed by stepper exposure. Specifically, the core layer 23 including the rib 23a is formed through processes such as resist coating, exposure to light, development, etching, and resist removal. This eliminates the need for the EB exposure that requires a long exposure time, leading to an improvement in the productivity of the polarization beam splitter. Further, the rib waveguide 50 and the channel waveguide 51 can be integrated on one substrate by stepper exposure. Accordingly, there is no need to form the rib waveguide 50 and the channel waveguide 51 separately on different substrates and to bond the substrates together with an adhesive or the like. This leads to an increase in the productivity of the polarization beam splitter.

To satisfy the phase conditions, the first arm waveguide 12 and the second arm waveguide 13 have different waveguide widths. For example, the waveguide width $w_2$ of the second arm waveguide 13 is larger than the waveguide width $w_1$ of the first arm waveguide 12. To increase the waveguide width in the middle of the second arm waveguide 13, a part of the second arm waveguide 13 has a tapered shape. Specifically, the second arm waveguide 13 includes a tapered arm waveguide 18 which is gradually increased in the waveguide width from the demultiplexer 11 to the multiplexer 14, and a tapered arm waveguide 19 which is gradually decreased in the waveguide width. Similarly, the first arm waveguide 12 includes a tapered arm waveguide 18 having a width that gradually increases toward the multiplexer 14 from the demultiplexer 11, and a tapered arm waveguide 19 having a width that gradually decreases toward the multiplexer 14 from the demultiplexer 11.

In this manner, the first arm waveguide 12 and the second arm waveguide 13 are each provided with the tapered arm waveguides 18 and 19, which makes it possible to easily obtain the waveguide widths that satisfy the phase conditions. The formation of the waveguides with a tapered shape leads to a reduction in loss. Further, a fundamental mode can be input without using any unnecessary higher order modes for the arm waveguides 12 and 13, which are multi-mode waveguides, so that a stable polarization beam splitting function can be expected. Furthermore, the tapered arm waveguides 18 and 19, which are similar to the tapered arm waveguides 18 and 19 formed in the first arm waveguide 12, are formed in the second arm waveguide 13. A phase shift caused due to a variation in the waveguide width can be compensated for. Accordingly, the first arm waveguide 12 and the second arm waveguide 13 which satisfy the phase conditions can be easily obtained.

Moreover, in the channel-type region 42, the waveguides have a linear shape. A part of the first arm waveguide 12 that is formed of the channel waveguide 51 and a part of the second arm waveguide 13 that is formed of the channel waveguide 51 have a linear shape. Thus, the waveguides have no bent portion in the channel-type region 42. This makes it possible to suppress a bend loss.

Although the silicon waveguides have been described above, the waveguides are not limited to the silicon waveguides. For example, semiconductor waveguides, such as InP, can also be used as the waveguides. A compound semiconductor material including various materials can be used for the waveguides.

The present invention has been described above with reference to exemplary embodiments. However, the present invention is not limited to the above exemplary embodiments. The configuration and details of the present invention can be modified in various manners which can be understood by those skilled in the art within the scope of the invention.

This application is based upon and claims the benefit of priority from Japanese patent application No. 2013-028866, filed on Feb. 18, 2013, the disclosure of which is incorporated herein in its entirety by reference.

REFERENCE SIGNS LIST

PBS POLARIZATION BEAM SPLITTER
90° OH 90-DEGREE OPTICAL HYBRID
11 DEMULTIPLEXER
12 FIRST ARM WAVEGUIDE
13 SECOND ARM WAVEGUIDE
14 MULTIPLEXER
15 ARM PORTION
16 INPUT WAVEGUIDE
17 OUTPUT WAVEGUIDE
18 TAPERED ARM WAVEGUIDE
19 TAPERED ARM WAVEGUIDE
21 SUBSTRATE
22 LOWER CLAD LAYER
23 CORE LAYER
23a RIB
23b TAPERED PORTION
24 UPPER CLAD LAYER
31 INPUT PORT
33 OUTPUT PORT
41 RIB-TYPE REGION
42 CHANNEL-TYPE REGION
43 TRANSITION REGION
45 FAN-IN
46 FAN-OUT
50 RIB WAVEGUIDE
51 CHANNEL WAVEGUIDE

The invention claimed is:

1. A polarization beam splitter comprising:
 a demultiplexer that is formed of a rib waveguide and demultiplexes input light into first input light and second input light;
 a multiplexer that is formed of a rib waveguide and multiplexes the first input light and the second input light, the first input light and the second input light being obtained by demultiplexing the input light by the demultiplexer;
 a first arm waveguide that guides the first input light to the multiplexer, at least a part of the first arm waveguide being formed of a channel waveguide; and
 a second arm waveguide that generates a phase difference in the second input light with respect to the first input light propagating through the first arm waveguide, and guides the second input light to the multiplexer, at least a part of the second arm waveguide being formed of a channel waveguide,
 wherein the channel waveguide and the channel waveguide are silicon waveguides each including a core layer formed by a silicon film, and
 wherein a part of the first arm waveguide that is formed of the channel waveguide and a part of the second arm waveguide that is formed of the channel waveguide have a linear shape.

2. The polarization beam splitter according to claim 1, wherein a tapered waveguide having a gradually changing width is formed in a transition region between the rib waveguide and the channel waveguide.

3. An optical device comprising:
 a polarization beam splitter according to claim 1; and
 a circuit that retrieves phase information on output light output from the polarization beam splitter.

4. The polarization beam splitter according to claim 1, wherein the core layer in the rib waveguide includes a rib, and a width of the core layer in the channel waveguide is substantially equal to a width of the rib.

5. The polarization beam splitter according to claim 1, wherein a width of the core layer in the rib waveguide is wider than a width of the core layer in the channel waveguide.

* * * * *